United States Patent [19]

Etoh et al.

[11] Patent Number: 5,040,121
[45] Date of Patent: Aug. 13, 1991

[54] SYSTEM AND METHOD FOR AUTOMATICALLY CONTROLLING VEHICLE SPEED TO DESIRED CRUISE SPEED

[75] Inventors: Yoshiyuki Etoh; Hiroshi Inoue; Kazuyuki Mori; Koichi Suzuki; Kinichiro Nakano; Hiroyuki Nomura; Isao Yamamoto; Kiyoshi Yoshida, all of Kanagawa, Japan

[73] Assignee: Nissan Motor Company, Ltd., Japan

[21] Appl. No.: 286,910

[22] Filed: Nov. 18, 1988

[30] Foreign Application Priority Data

Nov. 20, 1987 [JP] Japan .............................. 62-293214

[51] Int. Cl.$^5$ .......................................... B60K 31/00
[52] U.S. Cl. ............................ 364/426.04; 123/352; 180/179
[58] Field of Search .................. 364/426.04, 431.07; 123/352; 180/176–179

[56] References Cited

U.S. PATENT DOCUMENTS

| | | | |
|---|---|---|---|
| 4,553,209 | 11/1985 | Hyodo et al. | 123/352 |
| 4,646,861 | 3/1987 | Kawata et al. | 180/179 |
| 4,735,273 | 4/1988 | Naito | 180/179 |
| 4,829,437 | 5/1989 | Suzuki et al. | 364/426.04 |
| 4,829,438 | 5/1989 | Etoh | 364/426.04 |
| 4,835,696 | 5/1989 | Suzuki et al. | 364/426.04 |
| 4,845,622 | 7/1989 | Suzuki et al. | 123/352 |
| 4,855,918 | 8/1989 | Gray | 180/179 |
| 4,905,153 | 2/1990 | Suzuki et al. | 364/426.04 |
| 4,908,764 | 3/1990 | Etoh | 364/426.04 |
| 4,914,595 | 4/1990 | Suzuki et al. | 364/426.04 |
| 4,914,596 | 4/1990 | Etoh et al. | 364/426.04 |
| 4,922,428 | 5/1990 | Takahashi | 364/426.04 |
| 4,926,334 | 5/1990 | Suzuki et al. | 364/426.04 |

Primary Examiner—Gary Chin
Attorney, Agent, or Firm—Lowe, Price, LeBlanc & Becker

[57] ABSTRACT

A system and method for automatically controlling a vehicle speed to a desired cruise speed are disclosed in which a vehicle speed sensor which output an analog quantity corresponding to a current vehicle speed is provided, a vehicle speed determining circuit which derives the current vehicle speed on the basis of the analog quantity derived from the vehicle speed sensor and determines whether the derived current vehicle speed is below a predetermined speed above which the cruise speed control run is appropriate is furthermore provided independently of a control unit of the system. When the vehicle speed determining circuit outputs a determination signal indicating that the current vehicle speed is below the predetermined speed and the control unit outputs a predetermined control command signal, a power supply line connected to a throttle valve actuator is, at first, interrupted. Then, the power supply to the control unit is interrupted.

16 Claims, 2 Drawing Sheets

SYSTEM AND METHOD FOR AUTOMATICALLY CONTROLLING VEHICLE SPEED TO DESIRED CRUISE SPEED

BACKGROUND OF THE INVENTION (1) Field of the invention

The present invention relates generally to a system and method for automatically controlling a vehicle speed to a desired cruise speed in which a power supply to a throttle actuator is initially interrupted when a control command signal is derived from the control unit with a vehicle speed determined to be lower than a cruise speed allowable range.

(2) Description of the background art

Various kinds of systems for automatically controlling a vehicle speed to a desired cruise speed have been proposed. In such systems for automatically controlling the vehicle speed to the desired cruise speed, a set/coast switch is provided for setting a current vehicle speed to a target cruise. At this time, an opening angle of an engine throttle valve is adjusted to operate the vehicle at the set cruise speed. Therefore, it is convenient for a vehicle driver to cruise the vehicle without manual operation of an accelerator pedal.

SUMMARY OF THE INVENTION

It is an object of the present invention to provide a reliable system and method for automatically controlling a vehicle speed to a target or desired cruise speed which can achieve an improved operation of the vehicle with a savings in system power consumption.

The above-described object can be achieved by providing a system for automatically controlling a vehicle speed to a desired cruise speed, comprising: a) a power supply for the system; b) first means for detecting a current (islantaneous) vehicle speed and outputting an original data on the current vehicle speed; c) second means for calculating the current vehicle speed on the basis of the original input data on the vehicle speed derived from the first means and for outputting control command signals to perform controls on cruise speed runs of the vehicle through engine driving force adjusting mechanism installed in a vehicular engine; d) third means for deriving the current vehicle speed on the basis of the original data on the current vehicle speed derived from the first means independently of the second means and determining whether the derived vehicle speed by the third means is below a predetermined speed value; and e) fourth means for interrupting the power supply to the third means when the second means outputs at least one of the control command signals and while the third means determines that the derived vehicle speed is below the predetermined speed value.

The above-described object can also be achieved by providing a system for a vehicle, comprising: a) first means for detecting a current vehicle speed and outputting an analog quantity corresponding to the detected current vehicle speed; b) second means for operatively outputting a plurality of cruise run command signals independently of each other; c) third means responsive to any one of the cruise run command signals derived from the second means for deriving the current vehicle speed on the basis of the analog quantity outputted by the first means and outputting a plurality of control command signals according to the contents of one of the cruise run command signals which is inputted thereinto from the second means so that the vehicle speed is controlled according to the contents of the inputted cruise run command signal; d) fourth means responsive to any of the control command signals derived from the third means for adjusting an operating variable of an engine driving force adjusting mechanism installed in a vehicular engine with a power supply thereof received; e) fifth means for deriving the current vehicle speed on the basis of the analog quantity derived from the first means independently of the third means, determining whether the current vehicle speed derived by the fifth means itself is below a predetermined vehicle speed, and outputting a determination signal according to the result of determination; and f) sixth means responsive to the determination signal for canceling or continuing the power supply to the fourth means when the third means outputs a predetermined one of the control command signals according to the contents of the determination signal derived from the fifth means.

The above-described object can also be achieved by providing a method for automatically controlling a vehicle speed to a desired cruise speed, comprising the steps of: a) detecting a current vehicle speed and producing an analog quantity on the basis of the detected current vehicle speed; b) deriving the vehicle speed on the basis of the analog quantity produced in the step a) and operatively outputting at least one control command signal to perform controls on cruise speed runs of the vehicle through an engine driving force adjusting mechanism installed in a vehicular engine; c) deriving the current vehicle speed on the basis of the analog quantity derived in the step a) independently of the current vehicle speed derived in the step b) and determining whether the current vehicle speed derived in the step c) is below a predetermined speed value; and d) interrupting a power supply when outputting the control command signal in the step b) while determining that the current vehicle speed is below the predetermined speed value in the step c).

DETAILED DESCRIPTION OF THE PREFERRED EMBODIMENT

Reference will hereinafter be made to the drawings in order to facilitate understanding of the present invention.

Figure 1:
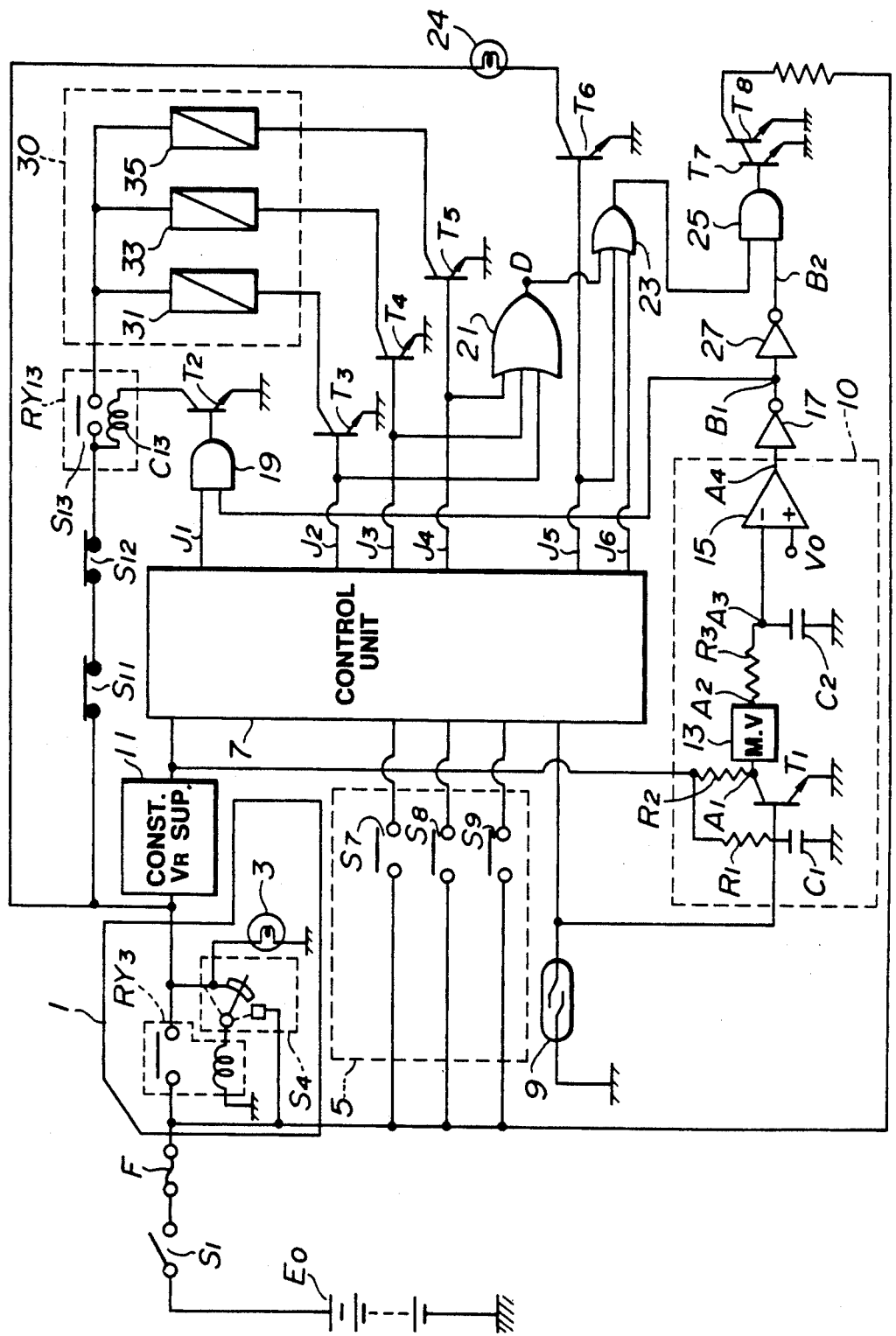
FIG. 1 is a circuit block diagram of a system for automatically controlling a vehicle speed to a desired cruise speed.
Figure 2:
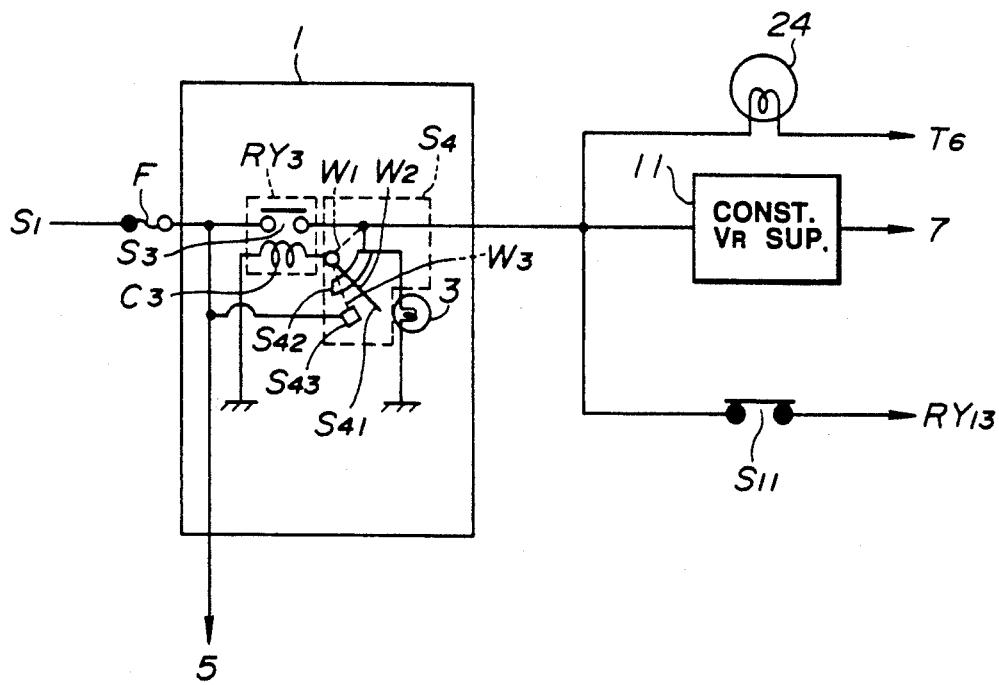
FIG. 2 is a schematic circuit wiring diagram of a main switch circuit 1 shown in FIG. 1.

FIGS. 1 and 2 show a structure of an automatic vehicle speed control system.

A main switch circuit 1 is connected to a battery power supply $E_o$ via an ignition switch $S_1$ and fuse F. The main switch circuit 1 includes a main relay $RY_3$, switch $S_4$, and a main lamp 3. A fuse F is connected to a contact $S_3$ of a main relay $RY_3$ and to a fixed contact $S_{43}$ of a switch $S_4$. The main relay $RY_3$ includes a contact $S_3$ and a coil $C_3$. One end of the coil $C_3$ is connected to a movable contact $S_{41}$ and the other end thereof is grounded. The contact $S_3$ is connected to the main lamp 3 and fixed contact $S_{42}$. In addition, the switch $S_4$ is constituted by the movable contact $S_{42}$ and fixed contacts $S_{42}$ and $S_{43}$. When a movable contact $S_{41}$ is placed on a position $W_1$, the switch $S_4$ is placed on an off state. When the movable contact $S_{41}$ is placed on a position $W_2$, one end of the coil $C_3$ is connected to the fixed contact $S_{42}$ via the movable contact $S_{41}$. In addition, when the movable contact $S_{41}$ is placed on a position $W_3$, the fixed contacts $S_{42}$ and $S_{43}$ are connected via the movable contact $S_{41}$. Furthermore, a spring member (not shown) is incorporated into the switch $S_4$. When an operator's hand is separated with the movable contact $S_{41}$ depressed toward a position $W_3$, a spring force of the above-described spring member causes the movable contact $S_{41}$ to be set toward the position $W_2$.

The operation portion 5 is preferably installed on a steering column, steering wheel, or an instrument panel convenient to the driver.

The operation portion 5 is connected to the control circuit 7 via a slip ring, i.e., slidable contact installed on a rotating portion of a steering wheel. Respective ends of a set/coast switch $S_7$, acceleration switch $S_8$, and resume switch $S_9$ are connected to a battery (DC) power supply $E_o$. In addition, the other ends of the set/coast switch $S_7$, acceleration switch $S_8$, and resume switch $S_9$ are connected to the control circuit 7 independently of each other.

The set/coast switch $S_7$ is a switch used to set the vehicle in a cruise run state. For example, when the vehicle runs at a speed of 60 Km/h, the set/coast switch $S_7$ is momentarily activated so that the cruise speed run is initiated at the current vehicle speed of 60 Km/h without change of the vehicle speed. It is noted that if the set/coast switch $S_7$ is continuously activated engine braking causes the vehicle speed to gradually be reduced. That is to say, the set/coast switch $S_7$ functions as a coast switch.

The acceleration switch $S_8$ functions as the acceleration function. When the acceleration switch $S_8$ is closed during the cruise operation, the vehicle speed is gradually increased. Thereafter, as the acceleration switch $S_8$ is open, the cruise run is executed at the vehicle speed at the time of open of the switch $S_8$ so that the new vehicle speed is set and maintained.

After the set of the cruise speed at 60 Km/h, a brake operation causes the cruise run state to temporarily canceled and to be reduced below 60 Km/h, the resume switch $S_9$ becomes effective. That is to say, the vehicle speed is gradually increased when the resume switch $S_9$ is turned on and thereafter turned off momentarily activated. Then, vehicle speed is gradually increased until reading a previously set cruise speed, i.e., 60 Km/h which is stored in storage means, to be described later.

A vehicle speed sensor 9 outputs vehicle speed information according to the speed of the vehicle. That is to say, the vehicle speed sensor 9 is provided with switching means which is open and closed according to the speed of the vehicle. The open and close cycling of the switch increases as the vehicle speed increases. An analog quantity of such an intermediate signal due to the switching operation of the switching means is supplied to the control circuit 7 and vehicle speed determining circuit 10 to provide vehicle speed information.

A control unit 7 includes a microcomputer for executing various control processings on the cruise speed control, storage means for storing information on the cruise run, and vehicle speed determining portion constituted by a digital circuit for calculating the vehicle speed on the basis of the speed information from the vehicle speed sensor 9. Various kinds of control signals are outputted on the basis of each information from the operation portion 5 and vehicle speed sensor 9. For example, when the set/coast switch $S_7$ is operated, the control unit 7 outputs a control command signal indicating that the vehicle is transferred in the cruise speed run on the basis of the vehicle speed information from the vehicle speed sensor 9. In addition, when the control unit 7 determines that the acceleration switch $S_8$ is operated, the control unit 7 outputs a control command signal indicating that the vehicle speed runs at a predetermined change rate of the vehicle speed with time (constant acceleration). Furthermore, when the brake operation is carried out, the cruise run state is temporarily suspended. Thereafter, when the control unit 7 detects operation of the resume switch $S_9$, the speed information stored in the storage means is retrieved and the control unit 7 outputs a control command signal indicating that the current vehicle speed is returned to the original cruise speed stored in the storage means.

The vehicle speed determining circuit 10 includes, for example, an analog circuit having a transistor $T_1$ the base of which is connected to a resistor $R_1$ and to a capacitor $C_1$, the resistor $R_1$ and capacitor $C_1$ being provided for eliminating noise. The base of the transistor $T_1$ is connected to the vehicle speed sensor 9. Analog speed information is supplied to the base of the transistor $T_1$. A collector of the transistor $T_1$ is connected to a constant voltage supply circuit 11 via a resistor $R_2$ for supplying a predetermined voltage, e.g., 5 volt DC voltagre to the transistor $T_1$. Hence, a switching operation is carried out on the basis of the vehicle speed information formed in the pulsed signal from the vehicle speed sensor 9.

Figure 3A:
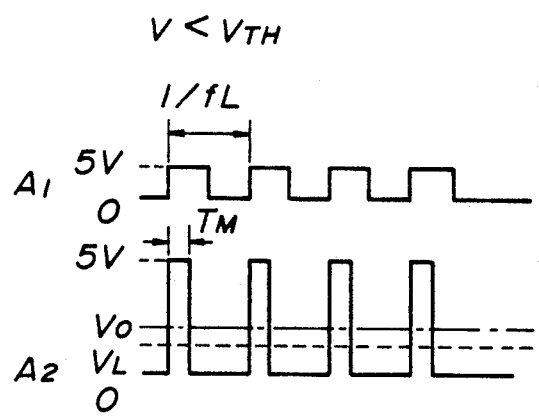
FIGS. 3(A) and 3(B) are signal timing charts for explaining an operation of a vehicle speed determining circuit 10 shown in FIG. 1.
Figure 3B:
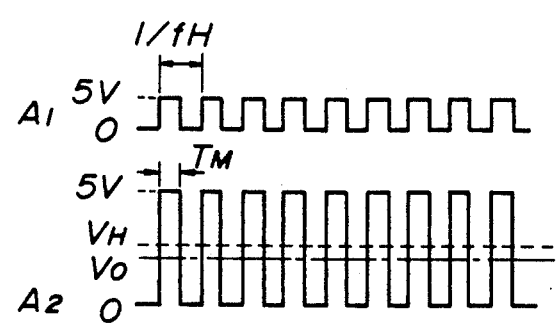

Transistor $T_1$ outputs a rectangular pulse signal $A_1$ having a period equivalent to the vehicle speed shown in FIG. 3(A) and FIG. 3(B). A monostable multivibrator 13 (M.V) is connected to an inverting input terminal of a capacitor $C_2$ and a resistor $R_3$. When the monostable multivibrator 13 inputs a pulse signal $A_1$, a pulse signal $A_2$ having a rectangular waveform of a predetermined pulsewidth $T_M$ is outputted at a timing of each rising edge of the pulse signal $A_1$ as shown in FIGS. 3(A) and 3(B).

The pulse signal $A_2$ constituted by the train of pulses is smoothed by means of a capacitor $C_2$ and a resistor $R_3$ so that an average voltage signal $A_3$ of each pulse voltage in the pulse train is supplied to an inverting input end of a comparator 15.

If the vehicle speed is a prede'ermined value of $V_{TH}$, e.g., below 30 Km/h, the value of $V_L$ of the voltage signal $A_3$ will be described with reference to FIG. 3A.

$$V_L = 5 \times T_M \times f_L \quad \cdots (1)$$

In equation (1), $f_L$ denotes an inverse number of a period of the pulse signal $A_1$ in a case when the vehicle speed V is below a predetermined speed $V_{TH}$, i.e., the frequency of the pulse signal $A_1$.

In the same way, the value of $V_H$ of the voltage signal $A_3$ in a case where the vehicle speed V of the vehicle is above a predetermined speed $V_{TH}$ can be expressed in the following equation (2).

$$V_{TH} = 5 \times T_M \times f_H \quad \cdots (2)$$

In the equation (2), $f_H$ denotes an inverse number of the pulse period of the pulse signal $A_1$ in a case when the vehicle speed V is above the predetermined speed $V_{TH}$, i.e., the frequency of the pulse signal $A_1$.

Hence, since the frequency of the pulse signal $A_1$ increases as the vehicle speed increase, the voltage signal $A_3$ indicating a value corresponding to the actual vehicle speed. If the vehicle speed is low, the value of the voltage signal $A_3$ is small. As the vehicle speed is increased, the value of the voltage signal is increased.

It is noted that the value of the predetermined speed $V_{TH}$ is set with the speed not appropriate to the cruise speed run.

A non-inverting input end of the comparator 15 receives a reference voltage $V_o$ from a reference voltage generator (not shown). A value of the reference voltage $V_o$ is set to a value larger than a value $V_L$ of the voltage signal $A_3$ during a low speed running but smaller than the value $V_H$ of the voltage signal $A_3$ during the high speed run.

$$V_L < V_o < V_H \qquad \text{---(3)}$$

Hence, the comparator 15 compares the reference voltage $V_o$ with the voltage signal $A_3$ and a high-level signal ("H") $A_4$ is outputted when a speed cruise run is below the reference voltage $V_o$. In addition, if the vehicle runs at a high speed exceeding the reference voltage $V_O$, a low level signal $A_4$ is outputted.

The vehicle speed determining circuit 10 is connected to one input terminal of the AND gate circuit 19 via an inverter 17. A signal $B_1$ which is an inversion of the signal $A_4$ is supplied to one input terminal of the AND gate circuit 19. In addition, one input terminal of the AND gate circuit 19 receives a control signal $J_1$ from the control circuit 7. The control signal $J_1$ indicates a low logic level ("L") when the control unit 7 determines that the vehicle speed V calculated by means of the vehicle speed determining portion is below a predetermined vehicle speed $V_{TH}$, i.e., a slow vehicle speed. Hence, the output signal of the AND circuit 19 indicates the high level ("H") only when all of the control circuit 7 and vehicle speed determining circuit 10 determines that the vehicle speed is high. The output terminal of the AND circuit 19 is connected to the base of the transistor $T_2$. When the AND circuit 19 outputs a high logic level ("H") signal, the transistor $T_2$ is turned on. A collector of the transistor $T_2$ is connected to one end of a coil $C_{13}$. The other end of the coil $C_{13}$ is connected to a contact $S_{13}$ and inhibit switch $S_{12}$. An actuator relay $RY_{13}$ is constituted by a normally open contact $S_{13}$ and coil $C_{13}$. The normally open inhibit switch $S_{12}$ is a contact which is open when a gear change lever of an automatic transmission is set in a parking range (P) or neutral range (N). The inhibit switch $S_{12}$ is connected to a main switch circuit 1 via a brake switch $S_{11}$. A normally closed brake switch $S_{11}$ is open when a brake pedal is depressed. In addition, a contact $S_{13}$ of the actuator relay $RY_{13}$ is connected to the actuator 30.

When transistor $T_2$ is turned on, an energization current flows through a coil $C_{13}$. When a contact $S_{13}$ is closed, the power supply is supplied to the coil $C_{13}$. Control signal $J_2$ is supplied to a base of a transistor $T_3$. A collector of a transistor $T_3$ is connected to a supply valve 31. The transistor $T_3$ controls the supply valve 31 in response to control signal $J_2$. In addition, the control signal $J_3$ of control circuit 7 is supplied to the base of transistor $T_4$, the collector of the transistor $T_4$ being connected to air valve 33. The air valve 33 is controlled in response to control signal $J_3$. Furthermore, a control signal $J_4$ of the control unit 7 is supplied to the base of a transistor $T_5$. A collector of a transistor $T_5$ is connected to a release valve 35. A control signal $J_5$ of the control circuit 7 is supplied to the base of a transistor $T_6$ and an input terminal of OR circuit 23. A collector of a transistor $T_6$ is connected to a main switch circuit 1 via a cruise lamp 24. Transistor $T_6$ causes the cruise lamp 24 to be lighted to indicate that the vehicle is in the cruise speed run.

An input terminal of the OR gate circuit 21 receives respective control signals $J_2$, $J_3$, and $J_4$, respectively. The output terminal of the OR circuit 21 is connected to another input terminal of an OR circuit 23. In addition, the input terminals of OR circuit 23 also receive control signals $J_5$ and $J_6$. The control signal $J_6$ is set to a low logic level ("L") during the low speed run below a predetermined speed of the vehicle speed. An output terminal of the OR circuit 23 is connected to one input terminal of the AND circuit 25. The other input terminal of the AND circuit 25 is connected to the vehicle speed determining circuit 10 via inverters 27 and 17.

The output terminal of the AND circuit 25 is connected to a base of a transistor $T_7$. Transistor $T_7$ and transistor $T_8$ are connected in a darlington configuration. A collector of a transistor $T_8$ is connected to the battery power supply $E_o$ via a fuse F and ignition switch $S_1$. Hence, the vehicle speed determining circuit 10, constituted by the externally connected analog circuit separate from the control circuit 7, determines that the vehicle speed V is below the predetermined speed $V_{TH}$. In this state, any one of the control signals $J_2$, $J_3$, $J_4$, $J_5$, and $J_6$ is outputted from a control circuit 7 as a high logic level signal ("H"). The high logic level ("H") signal of the AND circuit 25 is outputted from the AND circuit 25. Darlington-connected transistors $T_7$ and $T_8$. An excessive current flow through fuse F interrupts the power supply to the control circuit 7 and actuator 30.

The corresponding supply valve 31, air valve 33, and release valve 35 are actuated in response to control signals $J_2$, $J_3$, and $J_4$ from the control circuit 7 derived through transistors $T_3$, $T_4$, and $T_5$. A diaphragm (not shown) is operated to adjust an opening angle of a throttle valve so that the engine revolution speed is controlled.

Operation of the automatic cruise speed controlling system is described with reference to FIG. 1, and specifically wherein the vehicle speed V is below the predetermined speed $V_{TH}$ (in the low speed running state). the vehicle speed V is calculated in the analog form on the basis of the speed information from the vehicle speed sensor 9. When the control unit 7 determines that the calculated running speed V is below the predetermined speed $V_{TH}$, a high-level logic signal ("H") $A_4$ is outputted. The high level logic ("H") signal $A_4$ is inverted by means of the inverter 17. The low level ("L") $B_1$ is supplied to one input end of the AND circuit 19. In addition, the speed V of the vehicle is calculated by means of the vehicle speed determining portion of the incorporated digital circuit on the basis of the speed information from the vehicle speed sensor 9. When calculated vehicle speed V is determined to be below the predetermined speed $V_{TH}$, control signal $J_1$ of the low level is supplied to the other input terminal of the AND circuit 19. Hence, the transistor $T_2$ is turned off. Since the contact $S_{13}$ of the actuator relay $RY_{13}$ is open, the power supply to the actuator 30 is inhibited. In addition, during such a low speed run, the control signals $J_2$, $J_3$, $J_4$, $J_5$, and $J_6$ are low logic level are outputted from the control circuit 7. A low level ("L") signal is inputted to the one input terminal of the AND circuit 25. Since the low level ("L") signal is supplied to the one input terminal of the AND gate circuit 25, the transistors $T_7$ and $T_8$ are off.

For example, in a case where any of the control signals of $J_2$ to $J_4$ to control the supply valve 31, air valve 33, and release valve 35 is outputted as the high level ("H") signal, or alternatively, in a case where the control signal $J_5$ is outputted as the high level ("H") signal, or alternatively, in a case where the high level ("H") control signal $J_8$ is outputted, the high ("H") level signal is outputted to one input terminal of the AND circuit 25. In response vehicle speed determining circuit 10 determines that the vehicle speed V is below the predetermined speed $V_{TH}$ and outputs the high level ("H") signal $A_4$. The high level ("H") signal $A_4$ is outputted to one input terminal of the AND circuit 25 via the inverters 17 and 27. Hence, the AND circuit 25 outputs the high-level signal ("H") via the inverters 17 and 27 to the other input terminal of the AND circuit 25. AND circuit 25 outputs the high ("H") level signal and excessive current flows through the fuse F via the darlington connected transistors $T_7$ and $T_8$, both of which are conducted. Consequently, the power supply to the control circuit 7 and actuator 30 is interrupted.

Since in the above-described case the fuse F is blown, the cruise speed running apparatus cannot be recovered even if the operation switch is not operated.

Next, when the vehicle speed determining circuit 10 outputs the low-level signal ("L") $A_4$, the high level signal ("H") is outputted to one input terminal of the AND circuit 19. When the low ("L") level signal $J_1$ is outputted from the control circuit 7, the AND circuit 19 outputs the low-level ("L") signal $J_1$ to inhibit the power supply to the actuator 30. In addition, in a case where the low-level ("L") signal $A_4$ is outputted, the low-level ("L") signal is supplied to one input terminal of the AND circuit 25 via the inverters 17 and 27. The transistors $T_7$ and $T_8$ are thereby turnes off.

The operation of the automatic cruise speed controlling system in a case where the vehicle speed V is above the predetermined speed $V_{TH}$ is explained with reference to FIG. 1, as follows.

When the low-level ("L") signal $A_4$ is outputted from the vehicle speed determining circuit 10 and the control signal $J_1$ from the control circuit 7 is high level ("H"), a high level ("H") signal is supplied via the inverter 17 to one input terminal of the AND circuit 19. Hence, since the power supply to the actuator 30 is the transistor $T_2$, vehicle speed is controlled when $T_2$ is on.

When the control signal from the control circuit 7 is a high logic level ("H"), vehicle speed determining circuit 10 outputting the high level signal ("H"), the low-level ("L") signal $B_1$ is supplied to one input terminal of the AND circuit 19 via the inverter 17. The AND circuit 19 outputs the low-level ("L") signal, turning off transistor $T_2$, thereby interrupting the power supply to the actuator 30. In addition, the high level ("H") signal is outputted from AND circuit 25 to turn on transistors $T_7$ and $T_8$. Thus, the fuse F is blown. Consequently, the power supply to the control circuit 7 and actuator 30 is interrupted.

As described above, the vehicle speed determining portion 10 constituted by the analog circuit is provided in addition to the vehicle speed determining portion constituted by the digital circuit incorporated in the control unit 7. Operation of the power supply to the control unit and the actuator on the basis of the two vehicle speed determining circuits is interrupted. Therefore, an appropriate cruise run control can be executed in the automatic cruise speed controlling system. It is noted that the control unit 7 may be reset except upon interruption of the power supply.

Since, in the automatic cruise speed controlling system according to the present invention described hereinabove, the control command signal is outputted from the controlling means, the vehicle speed determining means determining that the control command signal is outputted, the power supply to the controlling means (control unit) is interrupted. Consequently, the control on the cruise speed control can accurately and appropriately be executed.

It will fully be appreciated by those skilled in the art that the foregoing description is made in terms of the preferred embodiment and various changes and modifications may be made without departing from the scope of the present invention which is to be defined by the appended claims.

What is claimed is:

1. A system for automatically controlling a vehicle speed to a desired cruise speed, comprising:
    a) first means for sensing the speed of a vehicle in which the system is mounted and outputting a speed signal indicative thereof;
    b) second means, having a command switch and an actuator associated with an engine driving force adjusting mechanism installed in a vehicular engine, for outputting a control command signal to the actuator in response to a command signal derived from the command switch so that the vehicle speed coincides with and is maintained at the desired cruise speed, the second means including third means for deriving an instantaneous vehicle speed from the speed signal of the first means and outputting a first signal when the derived instantaneous vehicle speed is below a predetermined threshold value, whereby the second means outputs said control command signal when the derived instantaneous vehicle speed exceeds the predetermined threshold value;
    c) fourth means for deriving the instantaneous vehicle speed on the basis of the speed signal derived from the first means independently of the second means and fifth means determining whether the derived instantaneous vehicle speed by the fourth means is below the predetermined threshold value, and outputting a second signal when the instantaneous vehicle speed derived by the fourth means is below the predetermined threshold value; and
    d) sixth means for interrupting a power supply to the actuator when either or both of the third and fifth means output either or both of the first and second signals, the sixth means further interrupting the power supply to the second means when the second means outputs the control command signal to the actuator, while the fourth means outputs the second signal.

2. A system as set forth in claim 1, which further comprises a main switch connected between the power supply and a constant voltage supply circuit for providing a constant bias voltage to the fourth means and wherein the first means including a switching mechanism which opens and closes at a speed according to the vehicle speed.

3. A system as set forth in claim 2, wherein the fourth means includes: a) a pulse signal generating circuit connected to the constant voltage supply circuit for producing a pulse signal having a constant pulsewidth and a frequency which is varied according to the vehicle speed derived from the switching mechanism of the first means, b) a smoothing circuit for deriving an average signal level of the pulse signal from the pulse generating circuit, and c) a comparator circuit for comparing the average signal level of the smoothing circuit with a reference voltage corresponding to a predetermined speed value and outputting a low level signal when the average value is below the reference voltage, the output signal of the comparator circuit being connected to one input of a first AND gate, the other input of the first AND gate being connected to a first output of the third means.

4. A system as set forth in claim 3, further comprises a seventh means responsive to the control command signal for actuating the engine driving force adjusting mechanism so that the speed of the vehicle is controlled to maintain at the desired vehicle speed and wherein an output of the first AND gate is connected to a first transistor which is turned off when the first AND gate outputs a low level signal, the first transistor being connected to an actuator switch connected between the main switch and an eight means whereby the eighth means is turned off when the first transistor is turned off.

5. A system as set forth in claim 4, which further comprises a first circuit connected to the output of the comparator circuit, output of the second means, and the power supply via an ignition switch and includes a fuse for dropping the power supply voltage so as to interrupt the power supply to the main switch when the comparator circuit outputs the low level signal and any one of the output control command signals derived from the second means indicate a high level signal.

6. A system as set forth in claim 5, wherein the seventh means includes normally open release valve which closes a chamber defined by a diaphragm linked to the engine driving force adjusting mechanism in response to the corresponding high-level control command signal from the second means, normally open air supply valve which closes the chamber in response to the corresponding high-level control command signal from the second means, and normally closed pressure supply valve which opens to introduce air pressure into the chamber so that the engine driving force is increased in response to the corresponding high-level control command signal from the second means, all one ends of the valves being connected to the actuator switch and each other end of the valves being connected to a corresponding second transistor.

7. A system as set forth in claim 6, wherein the first circuit includes (a) a first OR gate having inputs connected to respective outputs of the second means which are connected to bases of the second transistors, (b) a second OR gate having inputs connected to respective other outputs of the second means and an output of the first OR gate, (c) an inverter connected to the output of the comparator circuit, (d) a second AND gate having inputs connected to an output of the second OR gate and an output of the inverter, and (e) Darlington transistors connected between (i) an output of the second AND gate and (ii) the main switch which, said Darlington transistors responsive to a signal output by said second AND gate whereby said Darlington transistors are turned off when the second AND gate outputs a low level signal.

8. A system as set forth in claim 7, which further comprises a lamp connected between one of the other outputs of the second means and an output of the main switch which is turned off when said one other output of the second means outputs the low level signal or the main switch is turned off.

9. A system as set forth in claim 8, further comprising a set/coast switch operable for connecting an output from said Darlington transistors to the second means, an acceleration switch connected to the second means, and a resume switch connected to the second means, each of said switches operable to output a respective signal to the second means for controlling the vehicle speed to said desired cruise speed.

10. A system as set forth in claim 9, wherein the main switch includes (a) a relay connected between the fuse and constant voltage supply circuit, (b) a first fixed contact connected between an output of said relay and a main lamp, (c) a second fixed contact connected to the output of the Darlington transistors and said set/coast switch, and (d) a movable contact linked to a relay coil portion of said relay, an opposite end of the relay coil being grounded.

11. A cruise control system for a vehicle, comprising:
a) first means for detecting a vehicle speed and outputting an analog quantity corresponding to the detected vehicle speed;
b) second means for operatively outputting a plurality of cruise run command signals;
c) third means responsive to any one of the cruise run command signals outputted from the second means for deriving an instantaneous vehicle speed on the basis of the analog quantity outputted by the first means and outputting a plurality of control command signals according to the contents of one of the cruise run command signals which is inputted thereinto from the second means so that the vehicle speed is controlled in response to the inputted cruise run command signal;
d) fourth means responsive to any of the control command signals outputted from the third means for adjusting an operating variable of an engine driving force adjusting mechanism installed in a vehicular engine with a power supply;
e) fifth means for deriving the instantaneous vehicle speed on the basis of the analog quantity derived from the first means independently of the third means, a sixth means for determining whether the instantaneous vehicle speed derived by the fifth means is below a predetermined vehicle speed, and outputting a determination signal according to the result of determination; and
f) seventh means responsive to the determination signal for interrupting the power supply to the fourth means when the third means outputs a predetermined one of the control command signals.

12. A system as set forth in claim 11, wherein the operating variable of the engine driving force adjusting mechanism is an opening angle of a throttle valve.

13. A method for automatically controlling a vehicle speed to a desired cruise speed, comprising the steps of:
a) detecting the vehicle speed and producing an analog quantity on the basis of the detected vehicle speed;
b) deriving a current vehicle speed on the basis of the analog quantity produced in the step a) and operatively outputting at least one control command signal to perform controls on cruise speed runs of the vehicle through an engine driving force adjusting mechanism installed in a vehicular engine;

c) deriving the current vehicle speed on the basis of the analog quantity derived in the step a) independently of the current vehicle speed derived in the step b) and determining whether the current vehicle speed derived in the step c) is below a predetermined speed value; and d) interrupting a power supply to the engine driving force adjusting mechanism when the control command signal is outputted in the step b) while determining that the current vehicle speed is below the predetermined speed value in the step c).

14. A system for automatically controlling a vehicle speed to a desired cruise speed, comprising:

a) first means for detecting the vehicle speed of a vehicle in which the system is mounted and outputting a speed signal indicative thereof;

b) second means, having a command switch and an actuator associated with an engine deriving force adjusting mechanism installed in a vehicular engine, for outputting a control command signal to the actuator in response to a command signal derived from the command switch so that the vehicle speed coincides with and is maintained at the desired cruise speed, the second means further including third means for deriving an instantaneous vehicle speed on the basis of the speed signal by the first means and providing a first signal when the derived instantaneous vehicle speed is below a predetermined threshold value, whereby the second means provides the control command signal for the actuator when the derived instantaneous vehicle speed exceeds the predetermined threshold value;

c) fourth means for deriving the instantaneous vehicle speed on the basis of the speed signal derived from the first means independently of the second means, fifth means for determining whether the derived instantaneous vehicle speed by the fourth means is below the predetermined threshold value, and providing a second signal when the instantaneous vehicle speed derived by the fourth means is below the predetermined threshold value; and d) sixth means for interrupting the power supply to the actuator when the fifth means outputs the second signal, the sixth means further interrupting the power supply to the second means and the actuator when the command switch provides the command signal so as to provide the control command signal for the actuator in spite of the fifth means providing the second signal.

15. A system for automatically controlling a vehicle speed to a desired cruise speed, comprising:

a) first means for detecting the vehicle speed of a vehicle in which the system is mounted and outputting a speed signal indicative thereof;

b) second means, having a command switch and an actuator associated with an engine driving force adjusting mechanism installed in a vehicular engine, for outputting a control command signal to the actuator in response to a command signal derived from the command switch so that the vehicle speed coincides with and is maintained at the desired cruise speed, the second means further including third means for deriving an instantaneous vehicle speed on the basis of the speed signal by the first means and providing a first signal when the derived instantaneous vehicle speed is below a predetermined threshold value, whereby the second means provides the control command signal for the actuator when the derived instantaneous vehicle speed exceeds the predetermined threshold value;

c) fourth means for deriving the instantaneous vehicle speed on the basis of the speed signal derived from the first means independently of the second means, fifth means for determining whether the derived instantaneous vehicle speed by the fourth means is below the predetermined threshold value, and providing a second signal when the instantaneous vehicle speed derived by the fourth means is below the predetermined threshold value; and d) sixth means for interrupting the power supply to the second means including the actuator when either of the third or fifth means outputs either the first or second signal, the sixth means further interrupting the power supply to the second means including the actuator when the command switch provides the command signal so as to provide the control command signal for the actuator in spite of the fourth means providing the second signal.

16. A system for automatically controlling a vehicle speed to a desired cruise speed, comprising:

a) first means for detecting the vehicle speed of a vehicle in which the system is mounted and outputting a speed signal indicative thereof;

b) second means, having a command switch and an actuator associated with an engine driving force adjusting mechanism installed in a vehicular engine, for outputting a control command signal to the actuator in response to a command signal derived from the command switch so that the vehicle speed coincides with and is maintained at the desired cruise speed, the second means further including third means for deriving an instantaneous vehicle speed on the basis of the speed signal by the first means and providing a first signal when the derived instantaneous vehicle speed is below a predetermined threshold value, whereby the second means provides the control command signal for the actuator when the derived instantaneous vehicle speed exceeds the predetermined threshold value;

c) fourth means for deriving the instantaneous vehicle speed on the basis of the speed signal derived from the first means independently of the second means, fifth means for determining whether the derived instantaneous vehicle speed by the fourth means is below the predetermined threshold value, and providing a second signal when the instantaneous vehicle speed derived by the fourth means is below the predetermined threshold value; and d) sixth means for interrupting the power supply to the second means including the actuator when either or both of the third and fifth means output either or both of the first and second signals, the sixth means interrupting the power supply to the second means including the actuator when the command switch provides the command signal so as to provide the control command signal for the actuator in spite of the fifth means providing the second signal.

* * * * *